US010187694B2

(12) United States Patent
Meredith et al.

(10) Patent No.: US 10,187,694 B2
(45) Date of Patent: Jan. 22, 2019

(54) METHOD AND APPARATUS FOR ENHANCING AUDIENCE ENGAGEMENT VIA A COMMUNICATION NETWORK

(71) Applicant: AT&T INTELLECTUAL PROPERTY I, LP, Atlanta, GA (US)

(72) Inventors: Sheldon Kent Meredith, Roswell, GA (US); William Cottrill, Canton, GA (US); Brandon B. Hilliard, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 160 days.

(21) Appl. No.: 15/092,994

(22) Filed: Apr. 7, 2016

(65) Prior Publication Data
US 2017/0295404 A1    Oct. 12, 2017

(51) Int. Cl.
H04H 60/56     (2008.01)
H04N 21/466    (2011.01)
H04N 21/25     (2011.01)
H04N 21/4223   (2011.01)
H04N 21/422    (2011.01)

(52) U.S. Cl.
CPC ....... *H04N 21/4667* (2013.01); *H04N 21/252* (2013.01); *H04N 21/4223* (2013.01); *H04N 21/42203* (2013.01)

(58) Field of Classification Search
CPC ....... H04N 21/42201; H04N 21/42203; H04N 21/4223
See application file for complete search history.

(56) References Cited

U.S. PATENT DOCUMENTS

| 5,243,517 A | 9/1993 | Schmidt et al. |
| 5,724,987 A | 3/1998 | Gevins et al. |
| 5,762,611 A | 6/1998 | Lewis et al. |
| 6,228,038 B1 | 5/2001 | Claessens et al. |

(Continued)

FOREIGN PATENT DOCUMENTS

| CA | 2758272 A1 | 10/2010 |
| CA | 2775700 A1 | 7/2012 |

(Continued)

OTHER PUBLICATIONS

Cain, Jeff et al., "An Audience Response System Strategy to Improve Student Motivation, Attention, and Feedback", American Journal of Pharmaceutical Education, 73 (2) Article 21, 2009, 7 pages.

(Continued)

*Primary Examiner* — Olugbenga O Idowu
(74) *Attorney, Agent, or Firm* — Guntin & Gust, PLC; Douglas Schnabel

(57) ABSTRACT

Aspects of the subject disclosure may include, for example, capturing first monitoring information associated with an audience that is viewing a presentation, determining an actual audience engagement level by performing pattern recognition on the first monitoring information, comparing the actual audience engagement level with an expected audience engagement level to generate an engagement score for the presentation, and transmitting, to a device, a haptic feedback according to the engagement score during the presenting of the presentation. Other embodiments are disclosed.

20 Claims, 6 Drawing Sheets

(56) References Cited

U.S. PATENT DOCUMENTS

| | | |
|---|---|---|
| 7,120,880 B1 | 10/2006 | Dryer et al. |
| 8,332,883 B2 | 12/2012 | Hong et al. |
| 8,561,095 B2 | 10/2013 | Dimitrova et al. |
| 8,684,742 B2 | 4/2014 | Siefert et al. |
| 8,764,652 B2 | 7/2014 | Lee et al. |
| 8,799,005 B2 | 8/2014 | Dockter et al. |
| 8,898,687 B2 | 11/2014 | Krum et al. |
| 9,100,685 B2 | 8/2015 | Conrad et al. |
| 2007/0066916 A1 | 3/2007 | Lemos et al. |
| 2008/0065468 A1 | 3/2008 | Berg et al. |
| 2008/0222671 A1 | 9/2008 | Lee et al. |
| 2009/0131764 A1* | 5/2009 | Lee ................... A61B 5/0205 600/301 |
| 2009/0138332 A1 | 5/2009 | Kanevsky et al. |
| 2010/0004977 A1 | 1/2010 | Marci et al. |
| 2010/0211439 A1 | 8/2010 | Marci et al. |
| 2012/0002848 A1 | 1/2012 | Hill et al. |
| 2012/0219934 A1 | 8/2012 | Nakane et al. |
| 2013/0004930 A1 | 1/2013 | Sorenson et al. |
| 2013/0268954 A1* | 10/2013 | Hulten ................ H04N 21/442 725/12 |
| 2014/0363000 A1* | 12/2014 | Bowden ................ H04H 60/33 381/56 |
| 2015/0248615 A1* | 9/2015 | Parra ................... A61B 5/7275 706/12 |
| 2016/0011729 A1* | 1/2016 | Flores .................... G06F 3/167 715/728 |

FOREIGN PATENT DOCUMENTS

| | | |
|---|---|---|
| CA | 2846919 A1 | 9/2014 |
| EP | 2208346 A1 | 7/2010 |

OTHER PUBLICATIONS

Fan, Yuan-Yi et al., "BioSync: An Informed Participatory Interface for Audience Dynamics and Audiovisual Content Co-creation using Mobile PPG and EEG", NIME, 2013, 4 pages.

O'Brien, H.L. et al., "The development and evaluation of a survey to measure user engagement", School of Library, Archival and Information Studies, University of British Columbia, 2010.

Sung, M. et al., "Mobile-IT Education (mit. edu): m-learning applications for classroom settings", The Media Laboratory, Massachusetts, Journal of Computer Assisted Learning 21, 2005, 229-237.

* cited by examiner

200

400

METHOD AND APPARATUS FOR ENHANCING AUDIENCE ENGAGEMENT VIA A COMMUNICATION NETWORK

FIELD OF THE DISCLOSURE

The subject disclosure relates to a method and apparatus for enhancing audience engagement via a communication network.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
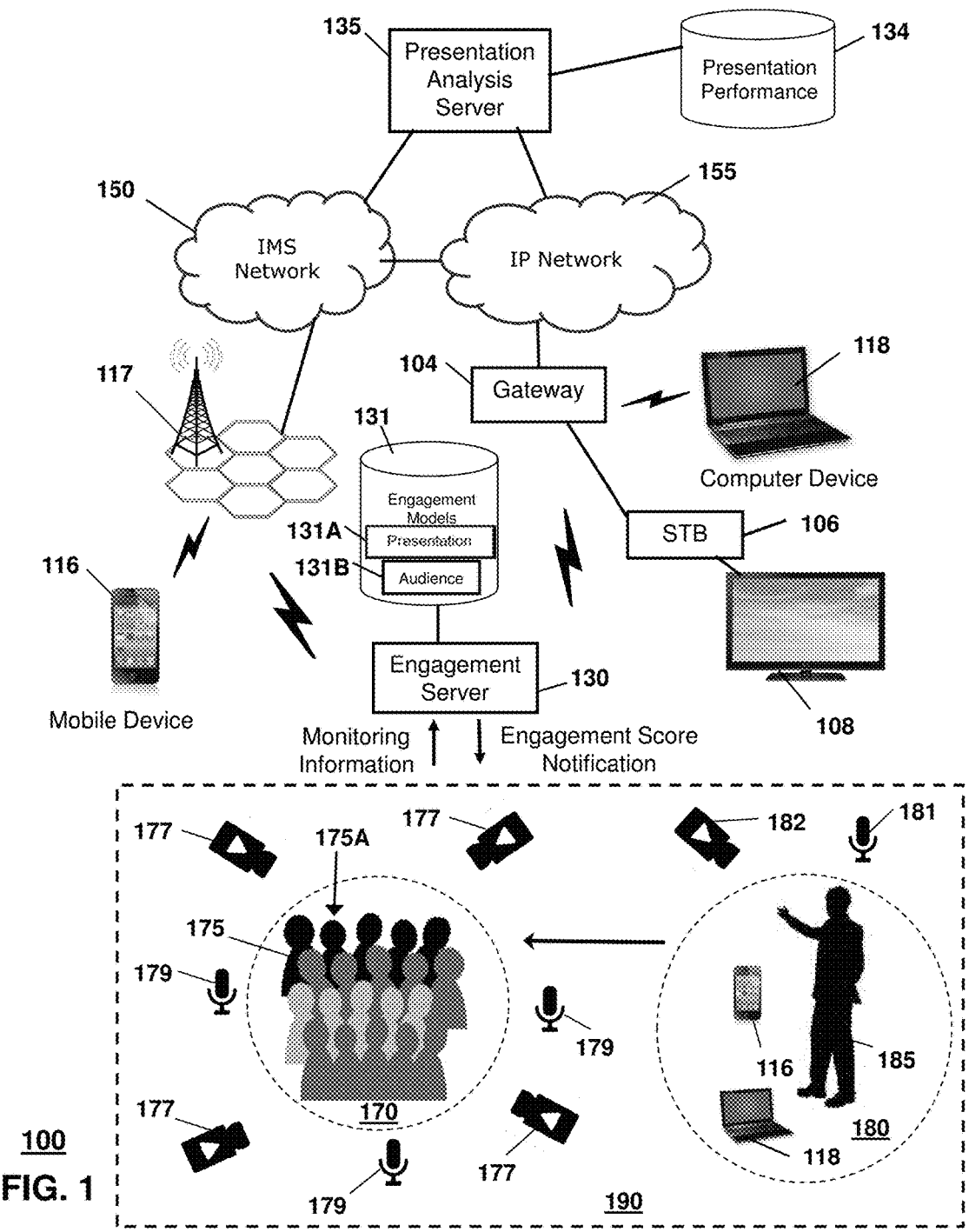
FIG. 1 depicts illustrative embodiments of a system for providing feedback on live presentations.

The subject disclosure describes, among other things, illustrative embodiments for providing feedback on audience engagement with a presentation. Various sensory inputs can be captured at an audience location. This sensory information can be used to detect and verify evidence of audience engagement (or disengagement) in a presentation that they are experiencing. An engagement score can be calculated for the audience as a whole, or specific members of the audience. The engagement score can be provided to the presenter as feedback, which can be dynamic (occurring in real time during the presentation) or can be retrospective (occurring as a post-mortem to the presentation). The feedback can be provided to the audience on an individual or collective basis. The engagement score can be compared to a threshold to determine whether the presenter is provided with dynamic feedback during the presentation. The engagement score can be augmented with further suggestion for improving audience engagement. The system can use engagement information to automatically adjust environmental systems for an audience location. Other embodiments are described in the subject disclosure.

One or more aspects of the subject disclosure include a server device including a memory to store executable instructions and a processor communicatively coupled to the memory. The processor, responsive to executing the executable instructions, can perform operations for receiving first monitoring information associated with a presenting of a presentation and analyzing presentation activity of the first monitoring information to identify time periods of active presenting. The processor can also perform operations for receiving second monitoring information associated with an audience that is viewing the presentation. The processor can further perform operations for selecting a portion of the second monitoring information corresponding to the active presenting time periods of the presentation and, in turn, analyzing the portion of the second monitoring information to identify an audience feature associated with audience engagement in the presentation. The processor can perform operations for submitting the audience feature that is identified to an audience engagement model to generate an actual audience engagement level. The processor can also perform operations for comparing the actual audience engagement level with an expected audience engagement level for the presenting of the presentation to generate an engagement score for the presenting of the presentation and transmitting, to a notification device, a notification based on the engagement score.

One or more aspects of the subject disclosure include a method, operating at a system comprising a processor, including receiving, by the system, first monitoring information associated with an audience that is viewing a presentation and, in turn, analyzing, by the system, the first monitoring information to identify an audience feature associated with audience engagement in the presentation. The method can also include identifying, by the system, an indicator of audience attentiveness to the presentation according to the audience reaction that is detected. The method can further include submitting, by the system, the audience feature that is identified to an audience engagement model to generate an actual audience engagement level. The method can include comparing, by the system, the actual audience engagement level with an expected audience engagement level for the presenting of the presentation to generate an engagement score for the presenting of the presentation, and, in turn, transmitting, to a notification device, a notification based on the engagement score.

One or more aspects of the subject disclosure include a machine-readable, storage medium, including executable instructions that, when executed by a processor, can facilitate performance of operations, including capturing first monitoring information associated with an audience that is viewing a presentation. The instructions can also facilitate performance of operations for determining an actual audience engagement level by performing pattern recognition on the first monitoring information. The instructions can further facilitate performance of operations for comparing the actual audience engagement level with an expected audience engagement level to generate an engagement score for the presentation. The instructions can facilitate performance of operations for transmitting, to a device, a haptic feedback according to the engagement score during the presenting of the presentation.

Figure 2:
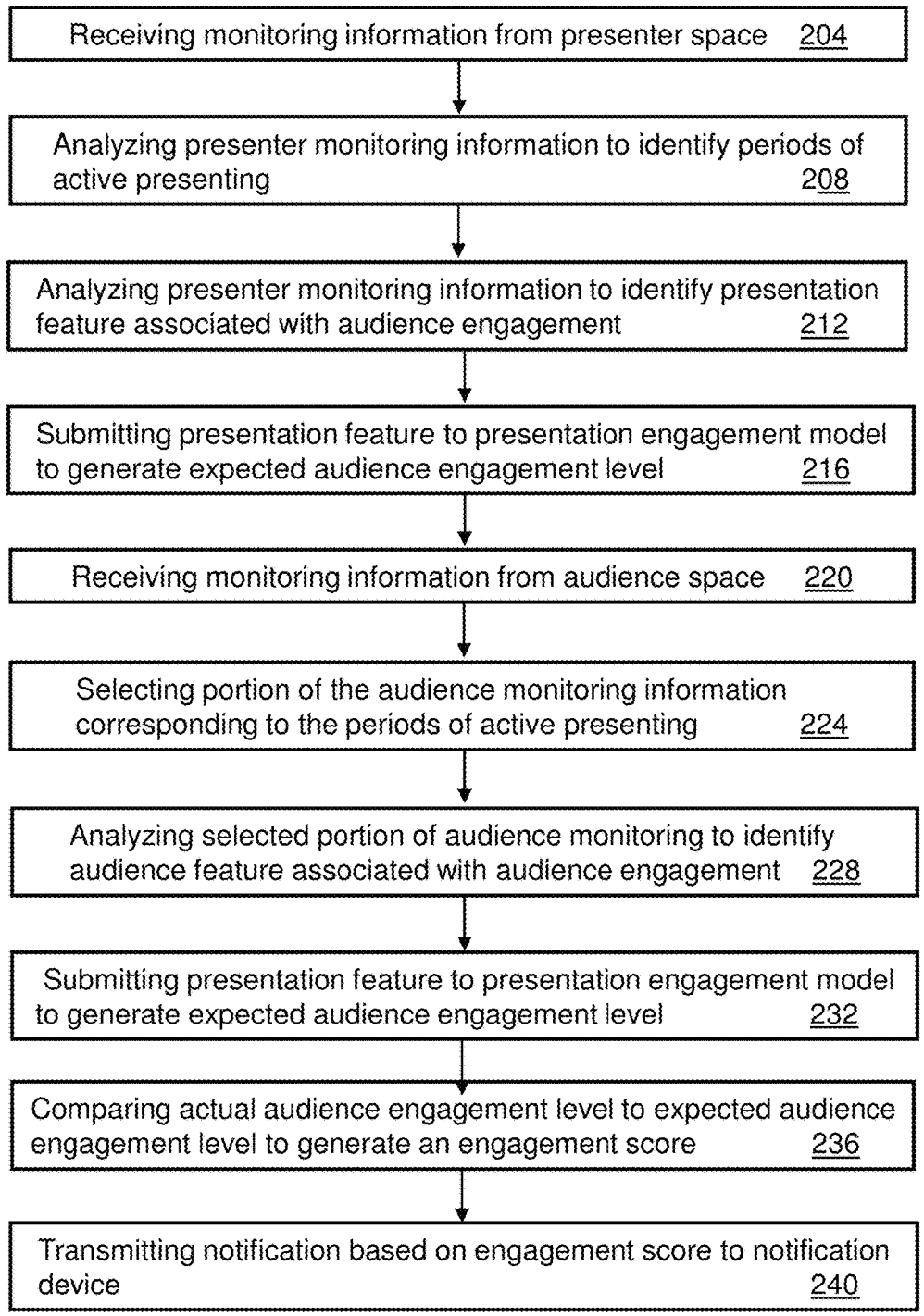
FIG. 2 depicts illustrative embodiments of a method used in portions of the system described in FIG. 1.

Referring now to FIGS. 1 and 2, a communication system 100 is illustrated. The system 100 can provide wireless communication services, including voice, video data and/or messaging services to mobile communications devices 116 and other computer devices 118. The system 100 can provide wireline communication services, such as serving as an Internet Service Provider (ISP) for computer devices 118. The system 100 can provide subscription television services via wired and/or wireless communications. For example, the system 100 can provide streaming media content to a mobile communication device 116, via a cellular link 117, to a computer device 118, via a wired or wireless gateway 104, or to a television or monitor device 108, via a set-top box device 106. System 100 can enable wireless communication services over a number of different networks, such as between mobile communication devices 116 and computer devices 118. Mobile communication devices 116 can include a number of different types of devices that are capable of voice, video, data and/or messaging communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal. The mobile communication device 116 can communication, via the IMS network 150, with other mobile communication devices, with landline communication devices, and with an Internet Protocol (IP) network 155, such as the Internet or the world-wide web (WWW). The communication system 100 can provide communications and sharing of various resources between mobile communication devices 116 and various devices, such as computer devices 118, which are connected to the IP network 155.

In one or more embodiments, the system 100 can include an engagement server 130. The engagement server 130 can communicate with the system 100 via wireless and/or wireline communications for accessing system resources, including resources accessible via the IMS network 150 and the IP network 155. Engagement server 130 can collect information monitored from a presentation environment 190, and can analyze the monitoring information to determine an engagement score that measures audience engagement in the presentation.

In one or more embodiments, the presentation environment 190 can include a presenter space 180 and an audience space 170. The presenter space 180 and audience space 170 can be co-located in the same room or venue or can be located in different rooms or venues. A presenter 185 can be located in a presenter space 180 at a first location, while an audience can be located in an audience space 170 at a second location. In the first scenario, the audience 170 may experience presentation by seeing the presenter 185 physically standing before them and hearing the presenter's words physically coming from the presenter's mouth. These physical manifestations can be augmented with video and/or audio as, for example, a display screen may be used to show the presenter 185 and/or other information to the co-located audience 175 or a sound amplification system may be used to reinforce the presenter's voice. In the second scenario, where the audience 175 is not co-located with the presenter 185, the audience 175 can experience the presentation via a closed-circuit television feed of the presentation. The viewing scenarios can be mixed as, for example, where the presenter 185 is speaking before a first audience 170 at a venue, where the presenter space 180 and the audience space 170 are co-located, while a closed-circuit television feed of the presentation is simultaneously shown to a second audience 170 at a second venue that is remote from the presenter space 180.

In one or more embodiments, the presenter space 180 can include equipment 181, 182 for monitoring the presentation. For example, a video camera 182 and a microphone 181 can be included for capturing video and audio of the presentation. Computing devices, such as a mobile communication device 116 and/or a computer device 118 can be included in the presentation space 180. In one or more embodiments, the audience space 180 can include equipment 177, 179 for monitoring the audience. For example, video cameras 177 and microphone 179 can be included for capturing video and audio of the audience. Computing devices, such as mobile communication devices 116 and/or a computer devices 118 can be included in the audience space 170.

In one or more embodiments, an array of cameras 177 and/or microphones can be placed at the audience space 170 to observe the audience 175. One or more cameras 182 and/or microphones 181 can be placed at the presenter space 180 to observe the presenter 185 (or multiple presenters). The cameras 177 and 182 can produce a stream of images, while the microphones 179 and 181 can produce audio signals that capture monitoring information for both the presenter 185 (and the presentation) and the audience 175.

In one or more embodiments, the monitoring information can be provided to an engagement server 130 that is located at or near the presentation environment 190. For privacy and/or security reasons, the system 100 can be arranged such that the captured monitoring information is only analyzed by a local engagement server 130 and is then discarded. In settings such as classrooms, the need for privacy and security may be especially great. For example, the engagement server 130 can be connected to the monitoring equipment 177-182 via closed wireline circuitry or via secure, short-range wireless communication links. In one embodiment, the monitoring information that is captured from the presenter space 180 can be kept for additional analysis or archival, while the monitoring information from the audience space 170 is discarded.

In one or more embodiments, all or part of the monitoring information can be forwarded via one or more networks 150, 155 to a presentation analysis server 135. In one embodiment, the presentation analysis server 135 can perform the analysis functions of the engagement server 130. This arrangement can be useful in situations, where the audience has provided permission for the monitoring information to be maintained, analyzed, and/or shared. For example, in a business setting, where the audience is comprised of employees, the employer-employee relationship may create a direct or implied permission for the employer to capture and maintain monitoring information from the employee audience members. In another example, attendees at an event, such as a rock concert, may provide passive permission for the event organizer to capture and use monitoring information by nature of their ticket stub agreements.

In one or more embodiments, the engagement server 130 can analyze the presenter monitoring information to determine when the presenter 185 is actively presenting to the audience 175. For example, a presentation can be scheduled for a block of time, such as between 1:30-2:00 pm. However, due to various reasons, the presenter may only actively present from 1:35-1:47 pm and, again, from 1:50-1:53 pm. The engagement level of the audience 175 in the presentation may be of particular interest, while the engagement level during times of non-presentation may not be of interest or may, in fact, be misleading. The engagement server 130 may analyze the monitoring information from the presenter space 180 to identify indicators of active presenting. For example, a video camera 182 can capture the presence of the presenter 185 in the presenting space 180 and use this as a simply indicator for identifying time periods of active presenting. In another example, the engagement server 130 can analyzed frames of video to detect particular types of presenter behavior that is consistent with active presenting. Image pattern recognition can be used to identify time periods of active presenting based any or several detected situations on the video, such as the presenter 185 facing the audience, movement of the mouth of the presenter 185, presentation-type gestures by the presenter 185, proximity to a lectern or podium, and/or a facial identification that the person on the video is the presenter. In one embodiment, the presenter 185 can signal when the presentation is "active" by interacting with a mobile device 116 or computing device 118 (e.g., interacting with an application that is linked to the engagement server 130) or by engaging a visual presentation aid (e.g., visual slide presentation software). The engagement server 130 can use any combination of these indicators to identify periods of time, where the presenter 185 appears to be actively presenting and the audience 175 is expected to be actively engaged.

In one or more embodiments, the engagement server 130 can analyze audio signals that are captured from the presenter space 180. The engagement server 130 can use a voice recognition algorithm to analyze the audio signals for determining if the presenter 185 is speaking, or if another person is speaking. The engagement server 130 can use a speech-to-text algorithm to analyze the audio signals for determining what the presenter 185 is saying. The engagement server 130 can analyze the volume of the presenter's voice to determine if it is consistent with a presentation or with a conversation, for example. In one or more embodiments, the engagement server 130 can use these types of analysis to determine whether the presenter 130 is actively presenting the presentation. For example, if someone else is speaking, or if the presenter 185 is speaking but not only to someone at the presenter space 180, then the engagement server 130 can conclude that the presentation is not current active, and, therefore, the monitoring information from the audience can be ignored.

In one or more embodiments, the engagement server 130 can use analysis of the monitored information from the presenter space 180 to determine an expected audience engagement level. In one embodiment, the engagement server 130 can analyze video content captured at the presenter space 180 to identify features such as location, speed, and range of movement for the presenter. Pattern recognition can be used to identify features such as gestures, facial expressions, and movement repetition. In another example, the engagement server 130 can analyze audio content captured at the presenter space 180 to identify features such as the relative volume of the presenter's voice, specific content of speech, rapidity of speech, repetition of phrases, clarity of language, grade-level of language, and use of speech techniques. Particular types of features in a presenter's words, actions, and behaviors are known to affect audience engagement in a presentation. Likewise, changes in these features can change audience engagement. For example, increases in audio characteristics, gestures, movement and so forth of a presenter can be indicative of a part of the presentation that the presenter is applying more emphasis to and is expected to receive more attention by the audience. The engagement server 130 can identify the presence or absence of these features.

In one or more embodiments, the engagement server 130 can use one or more engagement models 131 for making audience engagement predictions and/or actual the identified features in the monitored information from the presenter space 180 as input to a presentation engagement model 131A. In one or more embodiments, video and/or audio of prior speeches by this presenter 185 and/or other presenters can be similarly analyzed to identify video and audio features these prior presentations. An independent assessment of the presentation engagement level of these prior presentations can be derived by, for example, surveys or expert opinion. The features of the prior presentations and their corresponding presentation engagement levels, or scores, can be used to train a presentation engagement model 131A. In one or more embodiments, the features that are identified in the current presentation can be submitted into the trained presentation engagement model 131A to generate an expected audience engagement level for the current presenter 185 and presentation. As a result, a combination of the available monitoring information for the presenter space 180 can be used to generate an expected audience engagement level, which can be used as a reference to determine the relative engagement level of the audience. The expected audience engagement level can be determined by on a continuous basis throughout the presentation and is likely to fluctuate as the presenter discusses different subject matter, changes presentation techniques, and so on.

In one or more embodiments, the engagement server 130 can correlate, or filter, monitoring information that is captured from the audience space 170 with the time periods for which the engagement server 130 has determined that the presenter 185 is actively presenting to the audience 175. During time periods where the monitoring information from the presenter space 180 indicates that the presentation is not active, the engagement server 130 can avoid analyzing of the monitoring information from the audience space 170.

In one or more embodiments, for time periods of active presenting, the engagement server 130 can analyze the audience monitoring information to determine an actual audience engagement level. For example, the audience monitoring information can include a group of video cameras 177 that can capture what is happening in the audience space 170 during the presentation. The group of video cameras 177 can provide streams of video information to the engagement server 130. The engagement server 130 can use pattern recognition to analyze frames of the video streams to identify features of the audience. Image pattern recognition can be used to identify features, such as bodies, bodily features, heads, faces, postures, and positions. The engagement server 130 can identify movements, such as standing up and walking out (perhaps to get coffee). The engagement server 130 can analysis the video information from the group of video cameras 177 to identify instances of members of the audience 175 interacting with computer devices 118 and/or mobile devices 116. The engagement server 130 can use facial recognition software to identify specific faces of members of the audience as being specific individuals, whose facial profiles are known to the engagement server 130. The engagement server 130 can also recognize the presence of object features, such as electronic devices, books, papers, and writing instruments. The analysis can include comparing sequential frames in the video stream to detect rates of change in the position and/or location of bodily features or objects. For example, the analysis can use sequential frame comparison to detect rates of movement in features, such as head tilting, head rotation, eye blinking, and torso leaning. In one or more embodiments, visual features can imply levels of focus and/or engagement of the audience in general, and of individual members of the audience in general.

In one or more embodiments, the audience monitoring information can include a group of microphones 179 that can capture what is happening in the audience space 170 during the presentation. The group of microphones 179 can provide audio signal information to the engagement server 130. In one embodiment, the group of video cameras 177 and/or the group of microphones 179 can be coupled to the engagement server 130 over a short-range, wireless communication link, such as a Bluetooth or WiFi connection. The engagement server 130 can analyze the audio signals using pattern recognition to identify features, such as the sound of voices, rustling papers, entering data on keypads of computer devices 118 and/or mobile devices 116, and shifting in seats. The analysis can also analyzed the audio signals using voice recognition to identify voices of particular individuals, whose voice profiles are known to the engagement server 130. The engagement server 130 can use a speech-to-text algorithm to convert any speech content that is picked up by the microphones in the audience space into text. The group of microphones 179 can capture sound from both the presenter 185 and the audience 175. As a result, the sound of the presenter 185 can make it difficult for the engagement server 130 to isolate the sound of the audience 175. In one or more embodiments, the engagement server 130 can use a noise cancellation algorithm to isolate the audio that is generated from the audience 175 from the audio that is generated from the presenter 185. For example, the engagement server 130 can combine an inverted version of audio that is captured by the microphones 181 at the presenter space 180 with audio that is captured by the microphones 179 at the audience space 170. The resulting combination can cancel out the part of the audience space audio signal that is generated by the presenter 185 leaving the audience-generated audio as the main remaining component in the combined signal.

In one or more embodiments, the engagement server 130 can use analysis of the identified features from the monitored information at the audience space 170 to determine an actual audience engagement level. For example, the engagement server 130 use the identified features from the monitoring information of the audience space 170 as inputs to an audience engagement model 131B. In one or more embodiments, video and/or audio from prior audiences 175 can be similarly analyzed to identify video and audio features of these audiences as these audiences received the prior presentations. An independent assessment of the audience engagement level of these prior audiences can be derived by, for example, surveys or expert opinion. These features of the prior presentations and their corresponding audience engagement levels, or scores, can be used to train an audience engagement model 131B. Dynamic correlations are determined with respect to how changes in presentation techniques result in changes in audience attentiveness. In one or more embodiments, the features that are identified in the current presentation can be submitted to the trained audience engagement model 131B to generate an actual audience engagement level for the current audience 175 and the presentation that it is receiving. As a result, a combination of the available monitoring information for the audience space 170 can be used to generate an actual audience engagement level. The engagement server 130 can determine the actual audience engagement level continuously during the presentation. In one embodiment, the engagement server 130 can generate a pair of expected—actual engagement levels at many points during the presentation, so that a mapping of the expected to actual engagement is generated for comparison and analysis. For example, a presenter may change her presentation technique (increase vocal volume, move toward the audience) during the presentation, and these changes should be reflected in both the expected audience engagement level and the actual audience engagement level, where the later should track the former.

In one or more embodiments, the engagement server 130 can compare the expected audience engagement level with the actual audience engagement level to generate an engagement score for this presenter-audience combination. As described above, this comparison can, in fact, be a series of comparisons of a set of pairs of expected audience engagement levels and actual audience engagement levels. The engagement server 130 can determine if and when the actual audience engagement level significantly diverges from the expected audience engagement level. For example, if the presentation engagement model 131B predicts that the presenter 185 should achieve a relatively high level of audience engagement, and, in fact, the monitored information from the audience space 170, as processed through the actual audience engagement model 131B, agrees with this prediction, then there will be little deviation between the predicted and actual results. In this case, the presenter 185 did a good job of presenting (from an engagement perspective), and the audience 175 did a good job of engaging in the presented material. If the actual audience engagement level were substantially lower than the expected audience engagement level, then this would indicate a poor job by the audience in engaging with the presentation—the audience under-performed the level of the presentation. If the actual audience engagement level were substantially higher than the expected audience engagement level, then this would indicate a good job by the audience in engaging with the presentation—the audience over-performed the presentation.

In one or more embodiments, the engagement server 130 generate an engagement score based on the comparing of the expected audience engagement level and the actual audience engagement level. For example, a positive score could indicate audience over-performance, a negative score could indicate audience under-performance, and a score of zero could indicate that the audience engagement was as predicted. Alternatively, the scores could be presented over a positive number scale, such as from 0 to 10, corresponding with bad to good relative audience engagement. In another alternative, the scores could be normalized to a standard set of audience engagement scores, where a score of 1 could correspond to a standard level of engagement, less than one could correspond to below standard engagement, and greater than one would could correspond to above standard engagement. In one or more embodiments, the engagement server 130 can report separate engagements scores for the presenter 185 and the audience 175 based on the presentation engagement model 131A and the audience engagement model 131B.

In one or more embodiments, the engagement server 130 can report one or more engagement scores for the presenter 185, the audience 175, or a combination of the presenter 185 and the audience 175. In one embodiment, the engagement server 130 can determine one or more engagement scores during the presentation and can also send a notification of these scores during the presentation. For example, the engagement server 130 can send a notification to a mobile device 116 or a computer device 118 belonging to the presenter 185, an audience member 175A, or a third party.

The engagement server 130 can send a notification to a network device, such as a presentation analysis server 135 that can archive presentation engagement information for later analysis. In one embodiment, the engagement server 130 can send a notification that provides immediate feedback to the presenter 185. For example, the notification can generate a haptic feedback at the presenter space 180, where the feedback is, itself, presented at a mobile device 116 or a computer device 118. The haptic feedback can be, for example, a vibration, a screen flash, a text message, an audible message in an earbud, or another indication of an important engagement score event. The presenter 185 can experience an immediate feedback that can tell the presenter 185 that what he is doing is working or not working. In one embodiment, the engagement server 130 can provide a suggestion to the presenter 185 based on its analysis of the monitoring information. For example, the engagement server 130 determine from the monitoring information that the presenter 185 should slow down or speed up or speak louder and can provide this in its notification.

In one or more embodiments, the engagement server 130 can provide a notification of an engagement score and/or audience engagement levels to the audience 175. For example, the engagement server 130 can determine that the presentation engagement score is low and that the cause is a low, actual audience engagement level. Further, the engagement server 130 may determine a particular cause (or symptom) for the low audience engagement level, such as conversations between audience members. The engagement server 130 can send a notification to entire audience 175 via, for example, mobile devices 116 of the audience 175 or to a display that is visible to the audience 175. The notification can include an indication of the problem that has been detected.

In one or more embodiments, the engagement server 130 can identify a particular audience member 175A that appears to be exhibiting an issue with engagement with the presentation. For example, among an audience 175 that is displaying solid engaging in the presentation, a particular audience member 175A may be an "outlier," who is not engaged. For example, a member of the audience 175 (perhaps a student in a school setting) is sleeping though the presentation. The monitoring information, such as a stream from one of the video cameras that are monitoring the audience space 170, can identify the action of the sleeping audience member 175A via pattern recognition. Further, the engagement server 130 can determine the identity of the sleeping audience member 175A via, for example, the facial recognition algorithm or by recognizing a seating location that is associated with this particular audience member 175A. In one embodiment, the engagement server 130 can notify this audience member 175A directly, by sending a notification to a device 116 of the audience member 175A. Alternatively, the engagement server 130 can notify an authority (supervisor, teacher, counselor) over the audience member 175A so that the authority can address the issue.

In one or more embodiments, the engagement server 130 can transmit all or part of the monitored information, the audience engagement levels, and/or the engagement scores to a presentation analysis server 135. For example, the presentation analysis server 135 can be a remote processing engine that can receive monitoring information from the presenter space 180 and/or the audience space 170 and that can use machine learning techniques to correlate engagement scores and/or levels with a set of engagement patterns specific to age group, subject, gender, and/or other demographics. The presenter 185 can be provided with details about a continuum of engagement patterns that are demonstrated by data that has been collected over a large number of presentations, presenters, and audiences. The most important of the engagement patterns are arguably those that are found to create maximum and minimum engagement levels and/or scores. Such reporting can be used by others for comparative studies between various presenters.

In one or more embodiments, the engagement server 130 and/or the presentation analysis server 135 can create an engagement profile for each presenter 185. The engagement profile can be archived at a presentation performance database 134 and can be shared with the presenters 185 to help them best determine how to engage the audience in the future or via live feedback, where feasible. It is recognized that a particular audience 175 in an audience space 170, at a given time of day, may require a different engagement strategy than a different audience at a different space on a different day. However, the presentation factors and strategies for achieving high levels of audience engagement are predictable. Admittedly, the system 100 could be used as a mechanism for comparatively measure presenter style as well as engagement.

In one or more embodiments, the engagement scores can be retained while the underlying monitoring information (images and/or audio) can be discarded or retained to allay privacy concerns, as appropriate. For example, an opt-out configuration can be used, where the system would never make the audio or imagery available to anyone and the analysis would be conducted in-situ at, for example, the engagement server 130. In one embodiment, the engagement results could be made available to others, as appropriate. The engagement results could include details such as "where was the presenter?", "how was the presenter speaking?", "which way was the presenter facing?", or "what was the distribution of live audience engagement (number of audience members versus their engagement levels)?" In one embodiment, these records may be time-tagged and processed by a classification engine, such as a presentation analysis server 135, which may be a remote machine outside the presentation environment 190. In this arrangement, the presenters and live audience members need not be concerned about any specific things they've said or any images of them being sent anywhere or recorded for subsequent review. The preprocessing which occurs in or near the presentation environment would only retain imagery in memory (not storage) long enough to generate data for a time segment, after which the inputs would be deleted.

In one or more embodiments, the engagement server 130 can monitor the audience space 170 for indications of wireless communication traffic. In one embodiment, the engagement server 130 can connect to a local area network (LAN) that is serving the area in which the audience space 170 is located. The engagement server 130 can receive information from a local gateway device 104, or router, that is providing network services for the LAN, where the information can include local traffic features, such as the number of devices that are connected to the network, the size of the communication traffic load relative to capacity, and machine identification information (MAC addresses, dynamic IP addresses) for devices connected to the LAN. In one embodiment, the engagement server 130 can monitor the audience space 170 for cellular frequencies communications. In one embodiment, the engagement server 130 can compare the wireless communication traffic level during the active presenting time periods with a standard wireless communication traffic level for the audience space 170 to determine if the in-presentation level is high enough to infer that the audience 175 is displaying a symptom of inattentiveness to that presentation. The engagement server 130 can include the relative level of wireless communications to the other identified features of the audience 175 in the active presenting period while determining the actual audience engagement level and can add wireless communications (texting, accessing Internet-based applications), as needed, to the notifications that are sent to presenter 185 and/or audience 175 as a result of the engagement scoring.

In one or more embodiments, the engagement server 130 can communicate with systems that control one or more aspects of the environment of the audience space 170. For example, if the audience space 170 is inside of a building, then the audience space 170 may be subject to a heating, ventilation, and air conditioning system (HVAC) that is, itself, controlled by an HVAC control system. The audience space 170 may also be subject to lighting infrastructure that is controlled by a lighting control system. In one embodiment, the engagement server 130 can read a current temperature and thermostat setting from the HVAC control system. The engagement server 130 can also read a current configuration (e.g., a pre-set lighting configuration) for the lighting control system. In one embodiment, when the engagement server 130 determines that the audience is substantially under-performing (or, possible over-performing) in terms of engagement, then the engagement server 130 can transmit a request to HVAC system, the lighting system, or a combination of these systems to participate in the providing feedback to the audience 175 and/or presenter 185. For example, the engagement server 130 could request a discernable lighting adjustment as a signal to the presenter 185 that the current engage level needs to be improved. In another example, the engagement server 130 can signal the HVAC control system to reduce a thermostat setting for the audience space 170 in an attempt to wake up the audience.

FIG. 2 depicts an illustrative embodiment of a method used by in portions of the system described in FIG. 1. In particular, FIG. 2 shows illustrative embodiments of a method 200 for providing presentation engagement scoring and feedback.

In step 204, an engagement server 130 can receive monitoring information from a presenter space 180. The monitoring information that is captured from the presenter space 180 can be kept for additional analysis or archival or can be discarded to after it is analyzed. The monitoring information can include video and/or audio of the presenting space.

In step 208, the engagement server 130 can analyze the presenter monitoring information to identify periods of active presenting. The engagement server 130 may analyze the monitoring information from the presenter space 180 to identify indicators of active presenting. Pattern recognition and facial recognition can be used to identify the presenter, movement, position, and/or gestures from video monitoring. Voice recognition and speech-to-text analysis can be used to identify the presenter and/or the content of the presentation from audio monitoring. The engagement server 130 can determine when the presenter is actively presenting to the audience based on analysis of the indicators of active presenting.

In step 212, the engagement server 130 can analyze presenter monitoring captured at the presenter space 180 to identify one or more presentation features associated with audience engagement. The engagement server 130 can use pattern recognition to identify video features, such as location, speed, and range of movement for the presenter and gestures, facial expressions, and movement repetition. The engagement server 130 can use pattern and speech-to-text recognition to identify audio features, such as relative volume of the presenter's voice, specific content of speech, rapidity of speech, repetition of phrases, clarity of language, grade-level of language, and use of speech techniques. In one embodiment, patterns can be detected and analyzed to identify more significant patterns or more significant presenter features that are indicative of a part of the presentation that is expected to be more closely followed by the audience. For example, increases in audio characteristics, gestures, movement and so forth of a presenter can be indicative of a part of the presentation that the presenter is applying more emphasis to and is expected to receive more attention by the audience.

In step 216, the engagement server 130 can submit one or more presentation features to a presentation engagement model 131A. The presentation model 131A can be trained to predict audience engagement from identified presentation features. An expected audience engagement level can be generated by the presentation model 131A.

In step 220 the engagement server 130 can receive monitoring information from an audience space 170. The monitoring information that is captured from the audience space 170 can be kept for additional analysis or archival or can be discarded to after it is analyzed. The monitoring information can include video and/or audio of the presenting space.

In step 220, the engagement server 130 can select one or more portions of the audience monitoring information that corresponds to the periods of active presenting. The engagement server 130 can correlate, or filter, monitoring information that is captured from the audience space 170 with the time periods for which the engagement server 130 has determined that the presenter 185 is actively presenting to the audience 175.

In step 228, the engagement server 130 for the selected one or more portions of the monitoring captured at the audience space 170 to identify one or more audience features associated with audience engagement. The engagement server 130 can use pattern recognition to identify video features, such as bodies, bodily features, faces, postures, instances of members of the audience 175 interacting with computer devices 118 and/or mobile devices 116. The engagement server 130 can use pattern and voice recognition to identify audio features, such as the sound of voices, rustling papers, entering data on keypads of computer devices 118 and/or mobile devices 116, shifting in seats, and the identity of audience members, who are speaking.

In step 232, the engagement server 130 one or more audience features to an audience engagement model 131B. The audience model 131AB can be trained to predict audience engagement from identified audience features. An actual audience engagement level can be generated by the audience model 131B.

In step 236, the engagement server 130 can compare the expected audience engagement level with the actual audience engagement level to generate an engagement score for this presenter-audience combination. The engagement server 130 can determine if and when the actual audience engagement level significantly diverges from the expected audience engagement level.

In step 240, the engagement server 130 can transmit a notification based on the engagement score. The notification can be send to the presenter, the audience, a network server 135, and/or a third party. The notification can cause immediate feedback that can tell the presenter 185 that what he is doing is working or not working. The notification can identify a particular audience member 175A that is an "outlier," who is not engaged.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
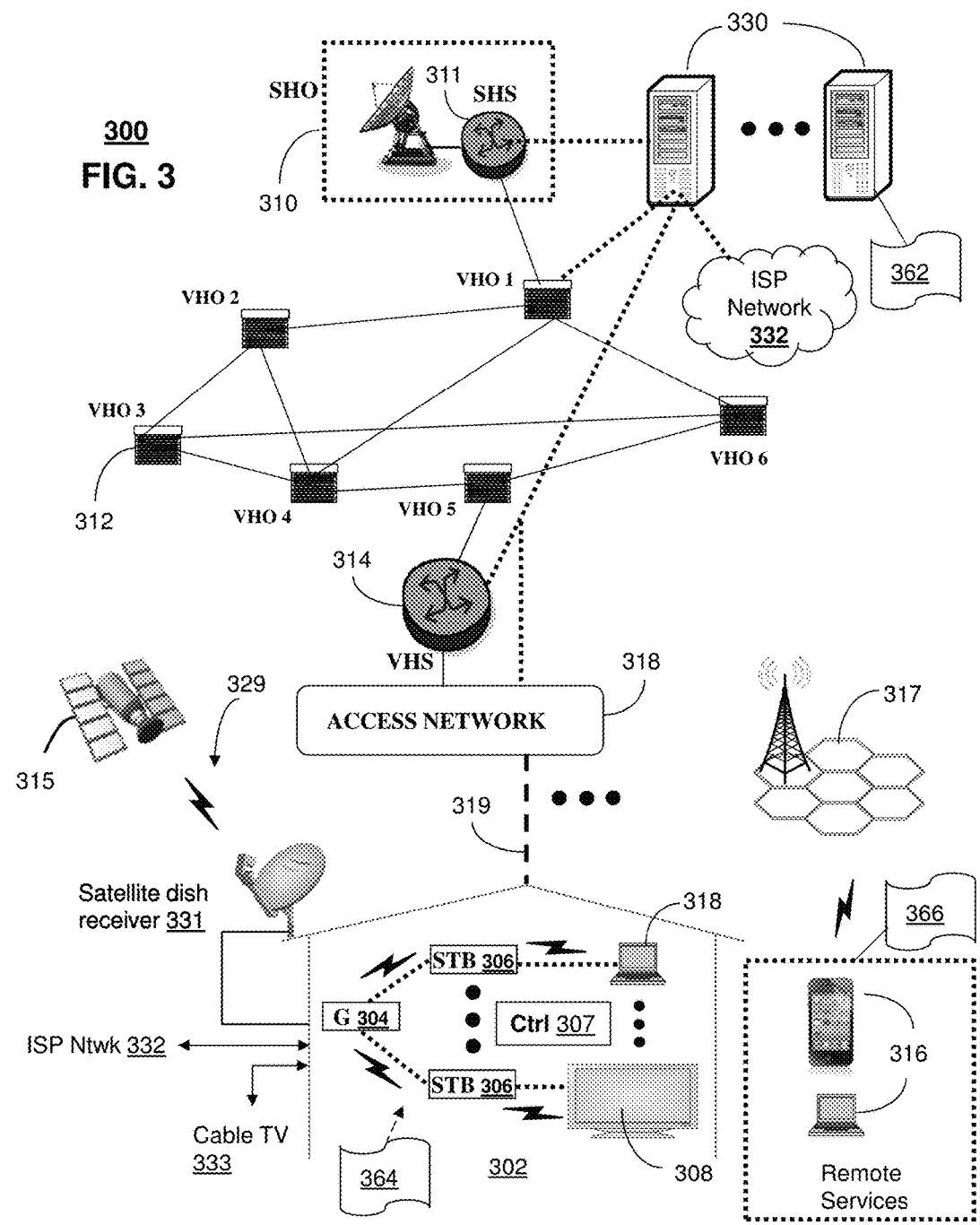
FIGS. 3-4 depict illustrative embodiments of communication systems that provide presentation feedback according to the embodiments illustrated in FIG. 1.

FIG. 3 depicts an illustrative embodiment of a first communication system 300 for delivering media content. The communication system 300 can represent an Interactive Television System, such as an Internet Protocol Television (IPTV) media system. Communication system 300 can be overlaid or operably coupled with system 100, of FIG. 1, as another representative embodiment of communication system 300. For instance, one or more devices illustrated in the communication system 300 of FIG. 3 can be used for providing feedback on audience engagement with a presentation. Various sensory inputs can be captured at an audience location. This information can be used to detect and verify evidence of audience engagement (or disengagement) in a presentation that they are experiencing. An engagement score can be calculated for the audience and can be provided to the presenter as feedback, which can be dynamic or retrospective.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 318 to commercial and/or residential buildings 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as an engagement server 130 (herein referred to as engagement server 330). The engagement server 330 can use computing and communication technology to perform function 362, which can include among other things, the presentation engagement feedback function described by method 300 of FIG. 3. For instance, function 362 of server 330 can be similar to the functions described for the engagement server 130, of FIG. 1, in accordance with method 200, of FIG. 2. The media processors 306 and wireless communication devices 316 can be provisioned with software functions 364 and 366, respectively, to utilize the services of engagement server 330. For instance, functions 364 and 366 of media processors 306 and wireless communication devices 316 can be similar to the functions described for the communication devices 116, 118, and 106 of FIG. 1 in accordance with method 200, of FIG. 2.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
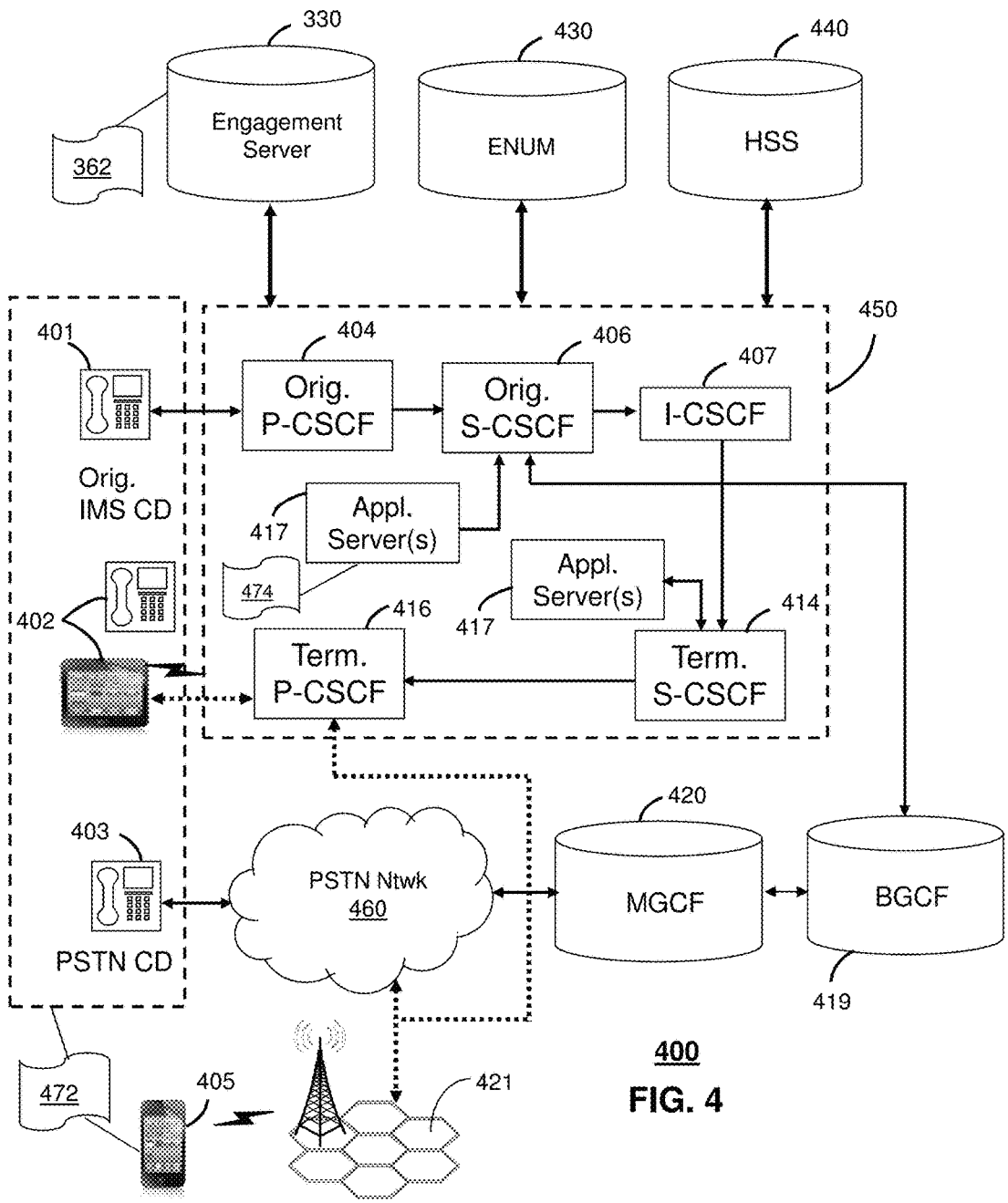

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100, of FIG. 1, and communication system 300 as another representative embodiment of communication system 300. The communication system 400 of FIG. 4 can be used for providing feedback on audience engagement with a presentation. Various sensory inputs can be captured at an audience location. This information can be used to detect and verify evidence of audience engagement (or disengagement) in a presentation that they are experiencing. An engagement score can be calculated for the audience and can be provided to the presenter as feedback, which can be dynamic or retrospective.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 400 of FIG. 4.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The engagement server 330 of FIG. 4 can be operably coupled to communication system 400 for purposes similar to those described above. Engagement server 330 can perform function 462 and thereby provide presentation engagement feedback services to the CDs 401, 402, 403 and 405 of FIG. 4 similar to the functions described for the engagement server 130 of FIG. 1 in accordance with method 200 of FIG. 2. CDs 401, 402, 403 and 405, which can be adapted with software to perform function 472 to utilize the services of the engagement server 330 similar to the functions described for communication devices 116 of FIG. 1, in accordance with method 200 of FIG. 2. Engagement server 330 can be an integral part of the application server(s) 417 performing function 474, which can be substantially similar to function 462 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
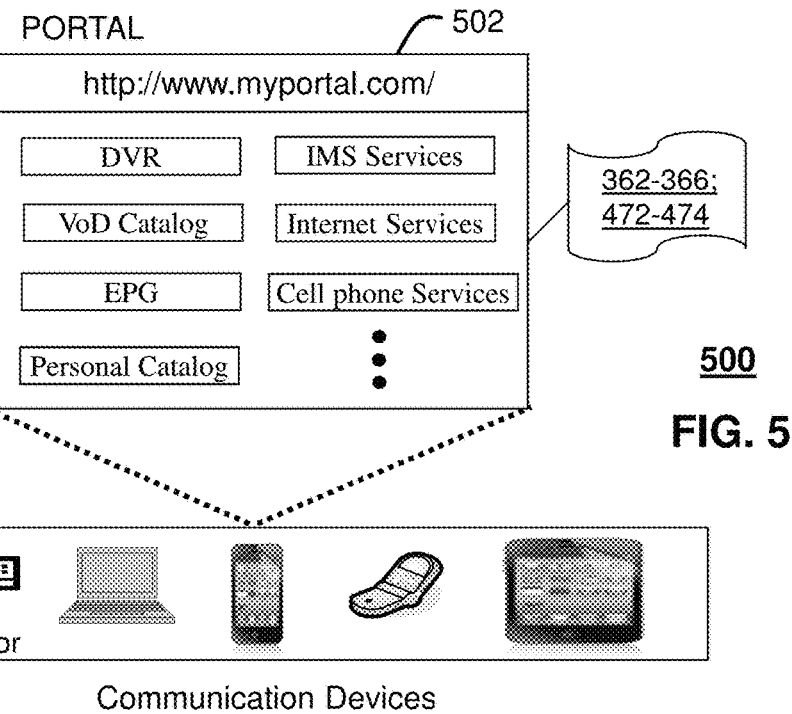
FIG. 5 depicts an illustrative embodiment of a web portal for interacting with the communication systems of FIGS. 1, 3, and 4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of system 100 of FIG. 1, communication system 300, and/or communication system 400. The web portal 502 can be used for managing services of systems 100 and 200 of FIGS. 1 and 2 and communication systems 400 and 500. A web page of the web portal 502 can be accessed by a Uniform Resource Locator (URL) with an Internet browser using an Internet-capable communication device such as those described in FIGS. 1, 3, and 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300 and 400. For instance, users of the services provided by the engagement server 130 or 330 can log into their on-line accounts and provision the servers 130 or 330 with preference information regarding media content types and/or configuration of media content or to provide device contact information to the engagement server 130 or 330 to enable it to communication with devices described in FIGS. 1 and 3-5. Service providers can log onto an administrator account to provision, monitor and/or maintain the systems 100 of FIG. 1 or server 330.

Figure 6:
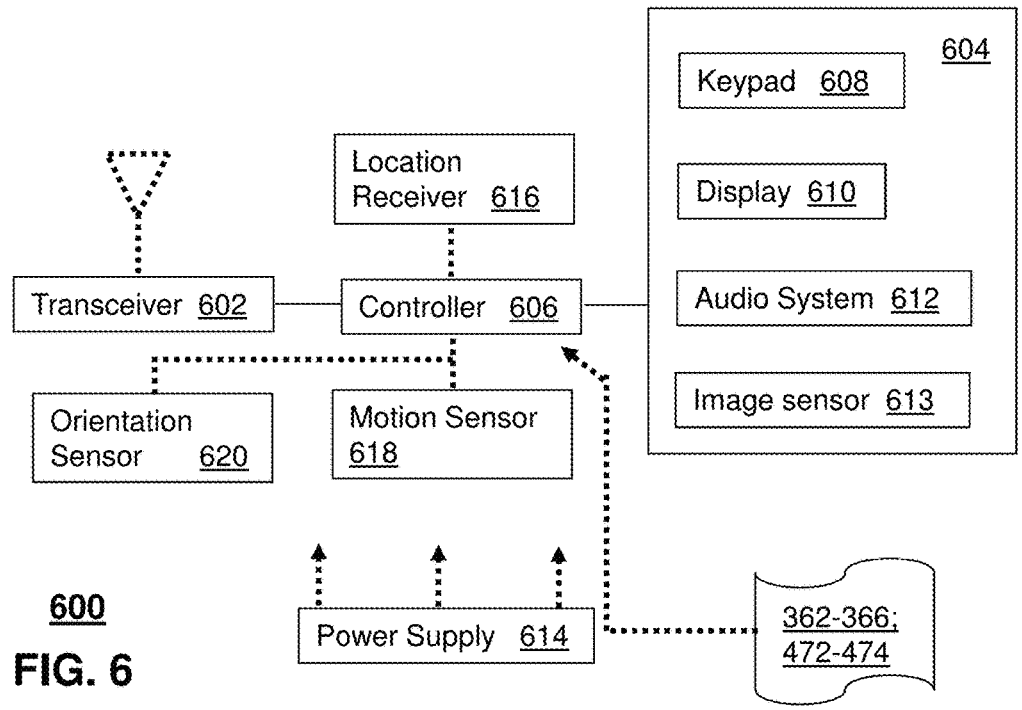
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1, 3, and/or 4 and can be configured to perform portions of method 200 of FIG. 2.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 306, the media devices 308, or the portable communication devices 316 of FIG. 3, as well as the IMS CDs 401-402 and PSTN CDs 403-405 of FIG. 4. It will be appreciated that the communication device 500 can also represent other devices that can operate in systems of FIG. 1, communication systems 300-400 of FIGS. 3 and 4, such as a gaming console and a media player. In addition, the controller 606 can be adapted in various embodiments to perform the functions 362-366 and 472-474, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
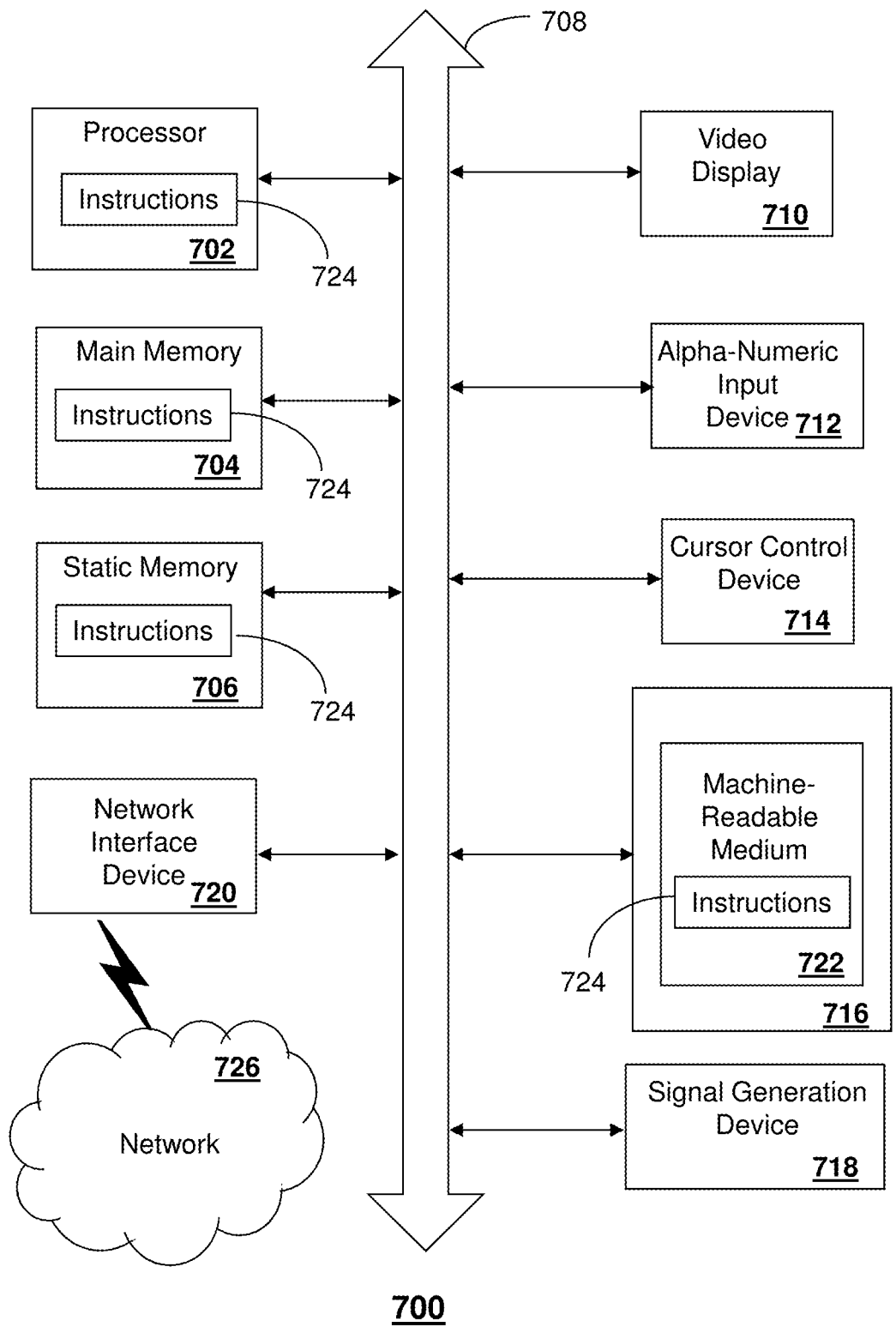
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the engagement server 130, the media processor 106, the mobile communication device 116, the computer device 118, the social media server 180, the subscription server 135, and/or other devices of FIGS. 1-5. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) can represent an example of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server device, comprising:
  a processing system including a processor; and
  a memory that stores executable instructions that, when executed by the processing system, facilitate performance of operations, comprising:
    receiving first monitoring information associated with a presenting of a presentation;
    analyzing presentation activity of the first monitoring information to identify time periods of active presenting;
    analyzing the first monitoring information to identify a presentation feature associated with audience engagement in the presentation, wherein the presentation feature is further associated with a characteristic of a technique of a presenter in the presenting; and
    submitting the presentation feature that is identified to a presentation engagement model to generate an expected audience engagement level;
    receiving second monitoring information associated with an audience that is viewing the presentation;
    filtering the second monitoring information according to the time periods of active presenting to generate filtered second monitoring information that excludes the second monitoring information outside of the time periods of active presenting;
    analyzing the filtered second monitoring information to identify an audience feature associated with audience engagement in the presentation;
    submitting the audience feature that is identified to an audience engagement model to generate an actual audience engagement level;
    comparing the actual audience engagement level with the expected audience engagement level for the presenting of the presentation to generate an engagement score for the presenting of the presentation; and
    transmitting, to a notification device, a notification based on the engagement score.

2. The server device of claim 1, wherein the operations further comprise:
  receiving prior monitoring information associated with a prior presenting of the presentation, wherein the prior monitoring information includes presentation features that are associated with the characteristic of the technique of the presenter in the prior presenting;
  receiving a prior audience engagement level associated with the prior presenting of the presentation; and
  training the presentation engagement model to generate the expected audience engagement level based on the prior monitoring information and the prior audience engagement level.

3. The server device of claim 2, wherein the engagement score is determined during the presenting of the presentation, wherein the notification is transmitted during the presentation, and wherein the notification includes a suggestion for improving the engagement score based on a modification of the characteristic of the technique of the presenter.

4. The server device of claim 1, wherein the notification comprises a haptic feedback, via the notification device, of the engagement score to the presenter during the presenting of the presentation.

5. The server device of claim 1, wherein the operations further comprise:
  detecting a first audience member in the filtered second monitoring information via pattern recognition analysis;
  determining a first engagement level for the first audience member according to a first audience feature of audience engagement that is associated with the first audience member; and
  comparing the first engagement level with the expected audience engagement level to generate a first engagement score that is associated with the first audience member.

6. The server device of claim 5, wherein the operations further comprise:
  comparing the first engagement level of the first audience member and the actual audience engagement level to determine a relative engagement level of the first audience member; and
  generating a second notification identifying the first audience member according to a result of the comparing of the first engagement level and the actual audience engagement level.

7. The server device of claim 1, wherein the operations further comprise:
  determining a plurality of actual audience engagement levels according to a plurality of audience features associated with audience engagement for a plurality of portions of the presentation; and
  transmitting a second notification indicating the plurality of actual audience engagement levels associated with the plurality of portions of the presentation.

8. The server device of claim 1, wherein the operations further comprise:
  receiving the second monitoring information from a plurality of video cameras that capture a plurality of images of the audience;
  performing image recognition on the plurality of images of the audience to identify a plurality of human features that are associated with the audience; and
  analyzing the plurality of human features to identify movements, expressions, postures, or combinations thereof, that are associated with the audience feature that is associated with audience engagement.

9. The server device of claim 1, wherein the operations further comprise:
  receiving the second monitoring information from a plurality of audio microphones that capture a plurality of sounds of the audience; and
  performing audio recognition on the plurality of sounds of the audience to identify a plurality of human sounds that are associated with the audience; and
  analyzing the plurality of human sounds to identify movements, vocalizations, interactions, or combinations thereof, that are associated with the audience feature that is associated with audience engagement.

10. The server device of claim 1, wherein the operations further comprise:
  receiving the second monitoring information from a radio frequency receiver that captures wireless communication signals at a location of the audience; and
  analyzing the wireless communication signals to identify communications associated with communication devices of the audience, wherein the communications are associated with the audience feature that is associated with audience engagement.

11. The server device of claim 1, wherein the operations further comprise:
  receiving the first monitoring information from a plurality of video cameras that capture a plurality of images of the presenter;
  performing image recognition on the plurality of images of the presenter to identify a plurality of human features that are associated with the presenter; and
  analyzing the plurality of human features to identify movements, expressions, postures, or combinations thereof, that are associated with a presentation feature associated with audience engagement.

12. The server device of claim 1, wherein the operations further comprise:
  receiving third monitoring information associated with a location of the audience;
  analyzing the third monitoring information to identify an environmental factor associated with the location of the audience; and
  generating a recommendation to change the environmental factor according to the engagement score.

13. The server device of claim 1, wherein a first location of the presenting of the presentation is remote from a second location of the audience.

14. The server device of claim 1, wherein the operations further comprise comparing the engagement score that is associated with the presenting of the presentation with a second engagement score that is associated with a second presenting of the presentation to determine a relative effectiveness of the presenting of the presentation.

15. A method, comprising:
  receiving, by a processing system including a processor, first monitoring information associated with an audience that is viewing a presentation;
  analyzing, by the processing system, the first monitoring information to identify an audience feature associated with audience engagement in the presentation, wherein the analyzing the first monitoring information ignores the first monitoring information corresponding to a time when the presentation is not currently active;
  submitting, by the processing system, the audience feature that is identified to an audience engagement model to generate an actual audience engagement level;
  analyzing, by the processing system, second monitoring information associated with the presenting of the presentation to identify a presentation feature associated with audience engagement in the presentation and with a characteristic of a technique of a presenter in the presenting, and wherein the analyzing the second monitoring information ignores the second monitoring information corresponding to the time when the presentation is not currently active; and
  submitting, by the processing system, the presentation feature that is identified to a presentation engagement model to generate an expected audience engagement level;
  comparing, by the processing system, the actual audience engagement level with the expected audience engagement level for the presenting of the presentation to generate an engagement score for the presenting of the presentation; and
  transmitting, by the processing system, to a notification device, a notification based on the engagement score.

16. The method of claim 15, wherein the notification comprises a haptic feedback, via the notification device, of the engagement score to the presenter during the presenting of the presentation.

17. The method of claim 15, further comprising:
  receiving, by the processing system, prior monitoring information associated with a prior presenting of the presentation, wherein the prior monitoring information includes presentation features that are associated with the characteristic of the technique of the presenter in the prior presenting;
  receiving, by the processing system, a prior audience engagement level associated with the prior presenting of the presentation; and
  training, by the processing system, the presentation engagement model to generate the expected audience engagement level based on the prior monitoring information and the prior audience engagement level.

18. The method of claim 17, further comprising:
  analyzing, by the processing system, presentation activity of the second monitoring information to identify time periods of active presenting; and
  selecting, by the processing system, a portion of the first monitoring information corresponding to the active presenting time periods of the presentation, wherein the first monitoring information is analyzed according to the portion of the first monitoring information to identify the audience feature associated with the audience engagement in the presentation.

19. A machine-readable storage medium, comprising executable instructions that, when executed by a processing system including a processor, facilitate performance of operations, comprising:
  capturing first monitoring information associated with an audience that is viewing a presentation;

determining an actual audience engagement level by performing pattern recognition on the first monitoring information;

determining a time when the presentation is not currently active;

analyzing second monitoring information to identify a presentation feature associated with audience engagement in the presentation and associated with a characteristic of a technique of a presenter in presenting of the presentation, wherein the analyzing the second monitoring information ignores the second monitoring information corresponding to the time when the presentation is not currently active; and submitting the presentation feature that is identified to a presentation engagement model to generate an expected audience engagement level;

comparing the actual audience engagement level with the expected audience engagement level to generate an engagement score for the presentation; and transmitting, to a device, a haptic feedback according to the engagement score during the presenting of the presentation.

20. The machine-readable storage medium of claim 19, wherein a first location of the presenting of the presentation is remote from a second location of the audience.

* * * * *